(12) United States Patent
Yamanaka et al.

(10) Patent No.: US 7,046,279 B2
(45) Date of Patent: May 16, 2006

(54) IMAGE TAKING APPARATUS

(75) Inventors: Mutsuhiro Yamanaka, Suita (JP); Kazuchika Sato, Kobe (JP); Noriyuki Okisu, Osakasayama (JP); Yasuhiro Morimoto, Takatsuki (JP); Hiroaki Kubo, Muko (JP); Keiji Tamai, Suita (JP); Kazuki Akaho, Amagasaki (JP); Shinichi Fujii, Osaka (JP)

(73) Assignee: Minolta Co., Ltd., Osaka (JP)

( * ) Notice: Subject to any disclaimer, the term of this patent is extended or adjusted under 35 U.S.C. 154(b) by 467 days.

(21) Appl. No.: 09/947,113

(22) Filed: Sep. 5, 2001

(65) Prior Publication Data

US 2002/0027600 A1 Mar. 7, 2002

(30) Foreign Application Priority Data

Sep. 6, 2000 (JP) ............................. 2000-270166
Sep. 7, 2000 (JP) ............................. 2000-271851

(51) Int. Cl.
*H04N 5/235* (2006.01)

(52) U.S. Cl. .................................... 348/229.1; 348/300

(58) Field of Classification Search ................ 348/267, 348/220.1, 364, 255, 355, 362, 363, 96, 229.1; 382/254
See application file for complete search history.

(56) References Cited

U.S. PATENT DOCUMENTS

| | | | | |
|---|---|---|---|---|
| 5,065,248 A | * | 11/1991 | Homma | ............. 348/229.1 |
| 5,124,842 A | | 6/1992 | Honda et al. | ............. 359/561 |
| 5,172,236 A | * | 12/1992 | Takemoto et al. | ............. 348/355 |
| 5,402,171 A | | 3/1995 | Tagami et al. | ............. 348/219 |
| 6,320,979 B1 | * | 11/2001 | Melen | ............. 382/154 |
| 6,583,811 B1 | * | 6/2003 | Kinjo | ............. 348/96 |

FOREIGN PATENT DOCUMENTS

| JP | 09-200508 A | 7/1997 |
|---|---|---|
| JP | 10-108057 A | 4/1998 |

OTHER PUBLICATIONS

Akira Kubota et al., "Registration of multi-focus images covering rotation and first reconstruction of arbitrarily focused image by using filters", *Technical Report of IECE, IE99-25* (Jul. 1999), pp. 1-8.

* cited by examiner

*Primary Examiner*—James J. Groody
*Assistant Examiner*—Heather R. Jones
(74) *Attorney, Agent, or Firm*—Sidley Austin LLP

(57) ABSTRACT

An image taking apparatus includes an image sensor which picks up an image of a photographic object and a selector which selects a first photographing mode or a second photographing mode and a controller. The second photographing mode is a mode for composing a plurality of picked-up images to create a composite image. The controller makes the image sensor pickup a photographic object image on the first photographing condition when the first photographing mode is selected by the selector, and makes the image sensor pick up a plurality of images of photographic objects on the second photographing condition different from said first photographing condition when the second photographing mode is selected by the selector.

15 Claims, 15 Drawing Sheets

FIG. 16

| SET ITEM | SET STATUS | CONTENTS |
|---|---|---|
| SHIFT PHOTOGRAPHING MODE | OFF | NORMAL PHOTOGRAPHING |
| | | SET THE SENSITIVITY EQUIVALENT TO THE ISO 200 |
| | ON | A PLURALITY OF IMAGES DIFFERENT IN PHOTOGRAPHING POSITION ARE TAKEN AND COMPOSED TO CREATE ONE IMAGE |
| | | SET THE SENSITIVITY EQUIVALENT TO THE ISO 800 |

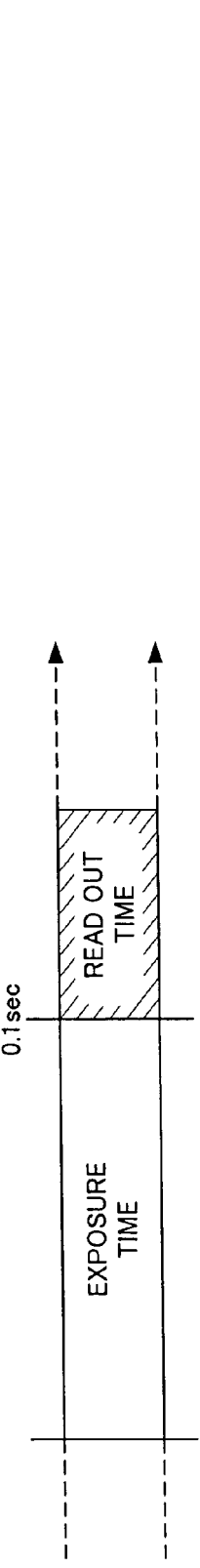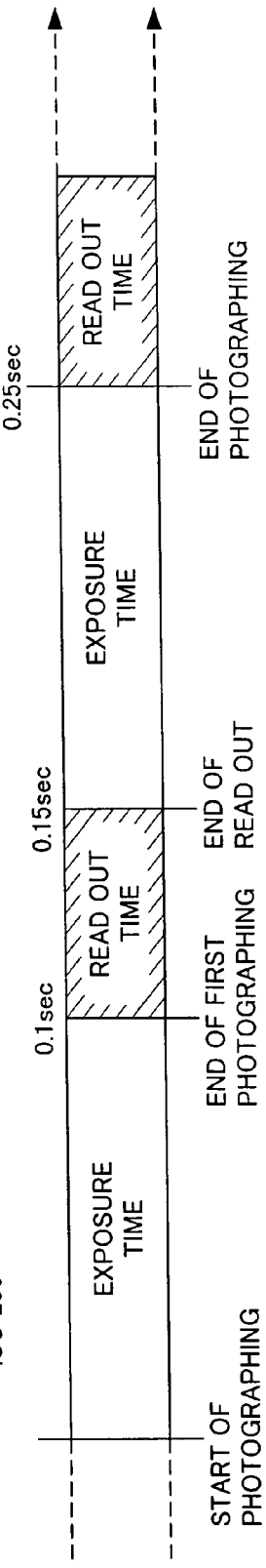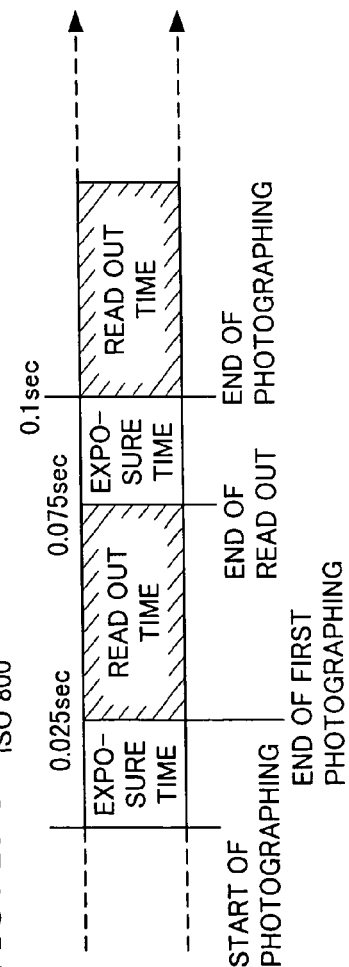

IMAGE TAKING APPARATUS

This application claims priority to Japanese Patent Applications No. 2000-270166 filed on Sep. 6, 2000 and No. 2000-271851 filed on Sep. 7, 2000, the disclosure of which is incorporated by reference in its entirety.

BACKGROUND OF THE INVENTION

1. Field of the Invention

The present invention relates to an image taking apparatus such as a digital camera having a multiplex image photographing mode other than a normal mode.

2. Description of Related Art

A digital camera having a multiplex image photographing mode for obtaining a single composite image from a plurality of photographed images is known. For example, Japanese Unexamined Laid-open Patent Publication No. H10-108057 discloses a digital camera that creates a pan-focus image using multiplex images picked-up with a predetermined iris diaphragm value. According to this digital camera, a plurality of images different in focal distance and focused on the foreground, the background or the like are picked up, and then a pan-focus image focused on each of a plurality of photographic objects is created from the aforementioned plurality of images.

Furthermore, it is also known that a digital camera has a function for creating a blur-controlled image in which some photographic objects such as a foreground and a background are adjusted in blur degree.

By the way, in a conventional digital camera, multiplex image photographing for creating a pan-focus image or a blur-controlled image is performed by setting the same iris diaphragm value, exposure time, etc. as in normal photographing conditions.

Accordingly, even if it is desired to take images on certain photographing conditions suitable for multiplex image photographing, it was impossible to perform such photographing.

On the other hand, in a digital camera that can take a plurality of images in a multiplex image photographing mode, it is a premise that the acquisition of a plurality of images in the multiplex image photographing mode is performed by taking a plurality of images of the same photographic object at the same or generally the same photographing position. Accordingly, in the multiplex image photographing mode, a plurality of images of the same photographic object are taken consecutively.

However, in the actual photographing, since a slight movement of a photographic object or hand blurring may occur during the photographing, it is difficult to obtain a plurality of image data all of which are suitable for the composing process.

In a multiplex image photographing mode, in order to minimize the influence of such hand blurring, etc., it is preferable to shorten the photographing time and intervals per photographing as much as possible.

Therefore, conventionally, there have been proposed to employ a plurality of image sensors in order to simultaneously obtain a plurality of image data or to employ a high-speed system clock in order to shorten the read-out time of the image signal from an image pick-up element such as a CCD.

However, in the former method, a plurality of images are obtained simultaneously, resulting in reduced influence of the photographic object's motion and/or the hand blurring due to the time progress. However, since a plurality of image sensors are arranged, the digital camera becomes larger and the manufacturing cost increases. In the latter method, a high-speed system clock is employed, resulting in an increased manufacturing cost of the digital camera. Thus, it is hard to realize this method.

SUMMARY OF THE INVENTION

It is an object of the present invention to provide an image taking apparatus capable of photographing on suitable photographing conditions in a multiplex image photographing on condition that image-composing processing such as blur-control processing is performed.

It is another object of the present invention to provide an image taking apparatus capable of taking a plurality of images suitable for multiplex image processing without causing a large-sized apparatus and cost-up while shortening photographing time and intervals and avoiding influence of hand blurring, etc.

According to a first aspect of the present invention, an image taking apparatus includes an image sensor which picks up an image of a photographic object, a selector which selects a first photographing mode or a second photographing mode, the second photographing mode being a mode for composing a plurality of picked-up images to create a composite image, and a controller which makes the image sensor pick up an image of the photographic object on a first photographing condition when the first photographing mode is selected by the selector, and makes the image sensor pick up a plurality of images of the photographic object on a second photographing condition different from said first photographing condition when the second photographing mode is selected by the selector.

With this image taking apparatus, when performing the multiplex image photographing in the second photographing mode, a plurality of images of the photographic object are taken on the second photographing condition different in the first photographing condition in the first photographing mode (i.e., a normal photographing mode). Therefore, it becomes possible to take images suitable for desired composite processing.

According to a second aspect of the present invention, an image taking apparatus includes an image sensor which takes an image of a photographic object, a selector which selects a first photographing mode or a second photographing mode, an amplifier which amplifies an output from the image sensor, and a controller which sets a first gain value to the amplifier, and makes the image sensor pick up an image of the photographic object when the first photographing mode is selected, and sets a second gain value higher than the first gain value to the amplifier and makes the image sensor pick up a plurality of images of the photographic object when the second photographing mode is selected by the selector.

In this image taking apparatus, the image signal obtained by the image sensor is amplified by the amplifier. When performing the multiplex image photographing in the second photographing mode, the gain value higher than the gain value in the first photographing mode (normal photographing mode) is set to the amplifier, and a plurality of images of the photographic object are taken. Accordingly, the exposure time per photographing and photographing intervals are shortened by a quick shutter speed. As a result, it becomes possible to cope with a moving photographic object, resulting in reduced hand blurring influence, etc., which enables to obtain a plurality of proper images.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which:

FIG. 16 is a table showing an example of the set content corresponding to the OFF and ON status of a shift photographing mode of the digital camera;

FIGS. 19A, 19B, and 19C are explanatory drawings showing the photographing time for every photographing mode.

DETAILED DESCRIPTION OF THE PREFERRED EMBODIMENTS

Preferred embodiments according to the present invention will be explained.

(First Embodiment)

Figure 1:
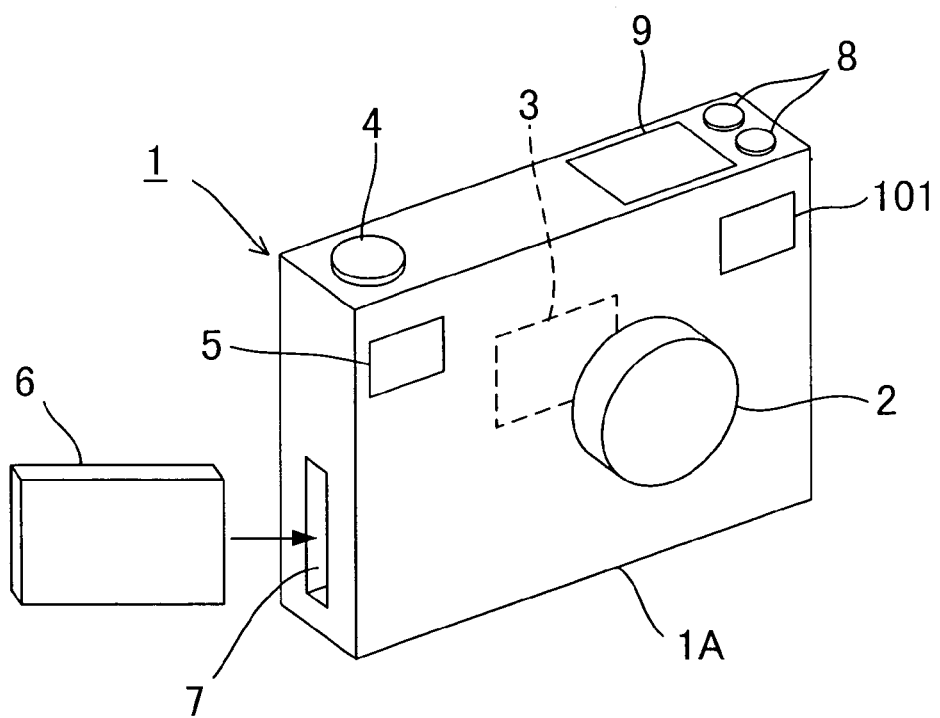
FIG. 1 is a perspective view showing a digital camera to which an image taking apparatus is applied according to an embodiment of the present invention.
Figure 2:
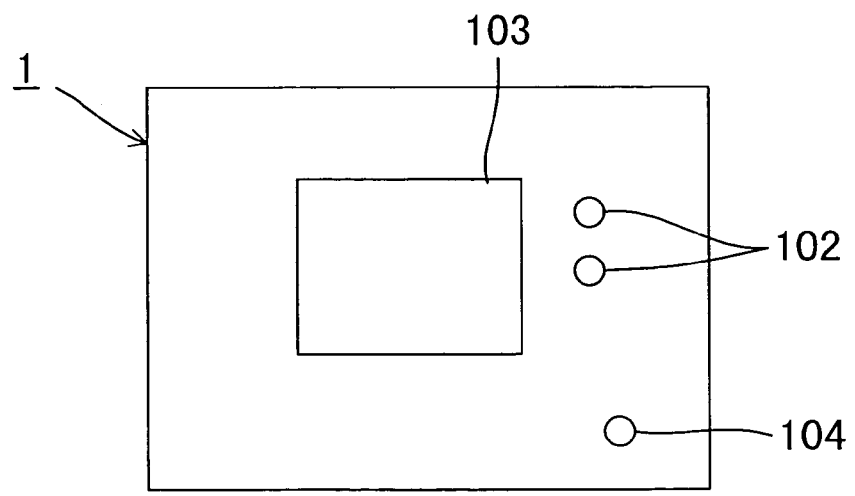
FIG. 2 is a rear view showing the digital camera.

FIGS. 1 and 2 show the perspective view and the rear view of a digital camera to which an image taking apparatus according to the first embodiment of the present invention is applied, respectively.

In FIG. 1 and FIG. 2, the reference numeral 1 denotes a digital camera. On the front face of the camera main body 1A, an image pick-up lens 2, a finder window 5, a distance measurement window 101, etc. are provided. In the camera main body 1A, a CCD 3 as an image pick-up element for photoelectrically converting the optical image is disposed on the optical path of the image pick-up lens 2. Furthermore, provided on the upper surface of the camera main body 1A are a shutter button 4, photographing mode setting keys 8, a liquid crystal display panel 9, etc. The reference numeral 6 denotes a recording media for recording image data, and the reference numeral 7 denotes a recording media insertion slit formed on the side surface of the camera main body 1A.

The photographing mode setting keys 8 are used for setting an exposure condition such as an iris priority exposure and a shutter speed priority exposure, setting a macro photographing mode or setting a zoom condition while confirming via the liquid crystal display panel 9 by the user.

On the rear face of the camera main body 1A, as shown in FIG. 2, image processing mode setting keys 102, an LCD monitor 103 as a view finder, an electronic buzzer 104, etc. are provided. The image processing mode setting keys 102 is used to set a normal photographing mode or a composite image mode (multiplex image photographing mode) for creating a pan-focus image or a blur controlled image, or to set the amount of blur, while looking at the LCD monitor 103.

In this digital camera 1, the image data picked up by the CCD 3 can be recorded in the recording media 6 like a conventional camera. In addition to this, the digital camera 1 has a pan-focus image creation function for creating a pan-focus image and a blur controlling function for creating a blur controlled image from a plurality of images different in focal distance. This blur controlling function is activated when the blur control mode is set by operating the image processing mode setting keys 102.

Figure 3:
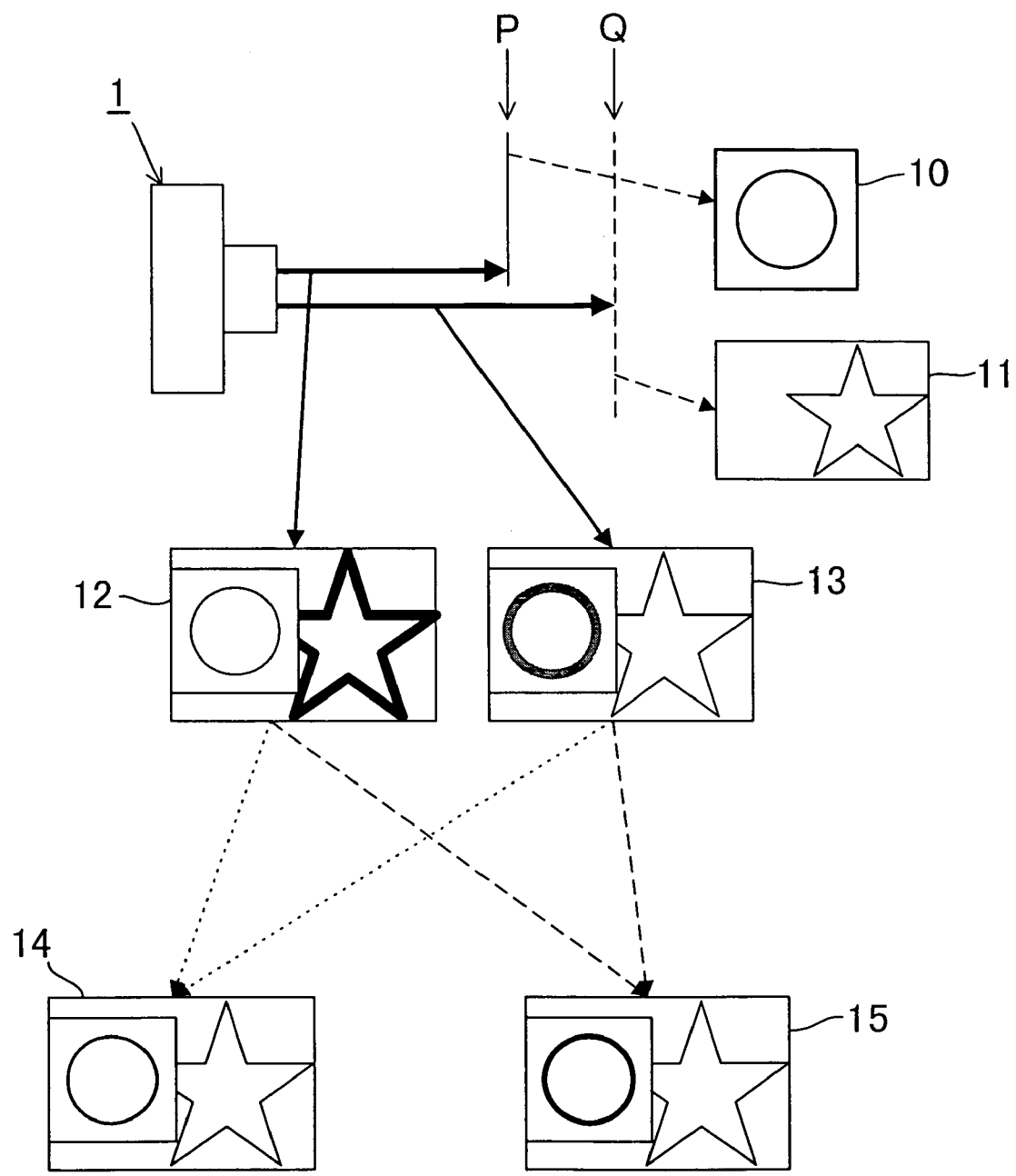
FIG. 3 is an explanatory drawing showing the image composing processing.

FIG. 3 is an explanatory drawing showing the operating situation of the digital camera 1 in a blur control mode, etc. This figure shows the so-called far-and-near-conflict scene in which photographic objects 10 and 11 exist on the P plane and the Q plane, respectively. In order to simplify the explanation, each of the photographic objects 10 and 11 is shown as a plane chart. The reference numeral 12 denotes an image focused on the P plane. In this image 12, the photographic object ○ of the chart 10 as a foreground is focused clearly and the photographic object ☆ of the chart 11 as a background is blurred (unfocused). On the other hand, the reference numeral 13 denotes an image focused on the Q plane. In this image 13, the photographic object ○ of the chart 10 as a foreground is blurred (unfocused) and the photographic object ☆ of the chart 11 is focused.

In the composite image mode, the image 14 or the image 15 is created from the aforementioned two images 12 and 13. The image 14 is the so-called pan-focus image focused on both the photographic objects 10 and 11. On the other hand, the image 15 is a blur-controlled image in which the blur-degree of the chart 10 as the foreground is emphasized than that of the chart 11 of the image 13 while focusing on the chart 11 as a background.

As mentioned above, in this digital camera 1, a pan-focus image and a blur-controlled image in which the blur degree of the foreground or the background is arbitrarily changed can be obtained from two or more images of the same scene photographed by changing the focused aspect (focused position).

The principle of the pan-focus image creation is disclosed in U.S. Pat. No. 5,124,842 and Japanese Patent Unexamined Laid-open Publication No. 10-108057. Furthermore, the blur-degree control technique is disclosed in Japanese Patent Unexamined Laid-open Publication No. H9-200508, "Registration of multi-focus images covering rotation and first reconstruction of arbitrarily focused images by using filters" written by Kubota and Aizawa, "SHINGAKU GIHOU IE 99-25 (1999-07)", etc., and therefore known to public. Accordingly, the explanation will be omitted here.

In the aforementioned explanation, there are two distance distributions of photographic objects, or the foreground and the background, and two images are taken. However, there may be three distance distributions, i.e., foreground, background and middle-ground, or more distance distributions.

In order to use the function for creating a pan-focus image or a blur-controlled image, the image processing mode setting keys 102 are used.

When the composite image mode and the blur degree are set by operating the image processing mode setting keys 102, the LCD monitor 103 displays: "Foreground focused, Background greatly blurred"; "Foreground focused, Background slightly blurred"; "Foreground greatly blurred, Background focused"; "Foreground slightly blurred, Background focused"; and "Pan-focus" so that a user can choose user's favorite one.

For example, the image 14 can be obtained by selecting the "Pan-focus," and the image 15 can be obtained by selecting the "Foreground greatly blurred, Background focused."

By the way, in the blur control mode, since the image expression effect by the iris diaphragm is carried out by the image processing after the photographing, an iris diaphragm value can be set regardless of the user's intention. In other words, by setting the photographing conditions, such as a combination of the iris diaphragm and the exposure time, so as to be different from the photographing conditions in a normal photographing mode, the blur-control processing can be simplified, the blur control effects can be increased, and the photographable conditions can be expanded.

First, the case where no limitation is set to the iris diaphragm in the blur-control mode will be explained.

One of the reasons that a clear image cannot be obtained is blurring of an image besides a failure to focus on an image. Therefore, in the blur-control processing, it is hard to judge whether the reason that a clear image cannot be obtained is a deterioration of clearness due to a failure to focus on an image or a deterioration of clearness due to blurring of an image. An exposure amount of an image pick-up element is decided by an iris diaphragm value and an exposure time of the image pick-up element. Therefore, it is possible to take an image at a proper exposure by selecting an appropriate combination of an iris diaphragm value and an exposure time among the combinations of from the combination of the minimum iris diaphragm value and the shortest exposure time to the combination of the longest exposure time and the maximum iris diaphragm value, depending on the photographic object.

Accordingly, in cases where no restriction is set to the iris diaphragm set in a blur-control mode, blurring of an image may be decreased by adopting an algorithm causing a combination of the iris diaphragm value which minimizes an exposure time (hereinafter referred to as "exposure integral time" or simply referred to as "integral time") of an image pick-up element and its shortest exposure time.

Next, the case where a limitation is set to the iris diaphragm in the blur-control mode will be explained.

In the blur-control processing according to the "Registration of multi-focus images covering rotation and first reconstruction of arbitrarily focused images by using filters" written by Kubota and Aizawa, "SHINGAKU GIHOU IE 99-25 (1999-07),", the characteristic of the blur in the photographed image is required in order to perform the blur-control processing. Accordingly, it is necessary to store the blur characteristic as data beforehand in an image taking apparatus. Therefore, in such blur-control processing, it becomes possible to lessen the required data by setting the iris diaphragm value used for photographing in the blur-control mode to have a predetermined value, which enables simplification of the blur-control processing.

On the other hand, in the blur-control processing disclosed by Japanese Unexamined Laid-open Patent No. H9-200508, a photographic object distinction is performed by analyzing an image. Therefore, an image with less blur is required. Accordingly, in such blur-control processing, by fixing the iris diaphragm value for photographing in the blur-control mode to the maximum value, i.e., minimizing the diameter of the iris diaphragm, an image with less blur can be obtained, resulting in improved accuracy of photographic object distinction, which in turn enables to perform stable blur-control processing. Furthermore, in case of creating a pan-focus image, it also becomes possible to lessen blur when photographing while setting the iris diaphragm value to the maximum. Accordingly, a pan-focus image can be obtained by the fewer number of photographing than the number of photographing with the iris diaphragm value set smaller.

Furthermore, in a method by which the blur degrees are compared in the plurality of photographed images as disclosed in, for example, the "Registration of multi-focus images covering rotation and first reconstruction of arbitrarily focused images by using filters" written by Kubota and Aizawa, "SHINGAKU GIHOU IE 99-25 (1999-07)," it is desirable that the blur of each image is strong. Therefore, in this case, it is more advantageous to set the iris diaphragm value to be small. Accordingly, in the blur control mode, the blur-control processing can be optimized by setting the iris diaphragm value to the minimum value, i.e., by setting the iris diaphragm to the full opening.

The above explanations are directed to the method using a predetermined iris diaphragm value at the blur control processing. However, in the multiplex image photographing mode such as a blur control mode, an exclusive iris diaphragm different from an iris diaphragm used in a normal photographing mode may be used. Next, the method using the exclusive iris diaphragm in the blur control mode will be explained.

Although a blur is generated in the photographic object which is out of focus since the light from one point of the photographic object does not gather on one point but spreads, the configuration of this spread becomes almost equal to the form of the iris diaphragm aperture.

Figure 4:
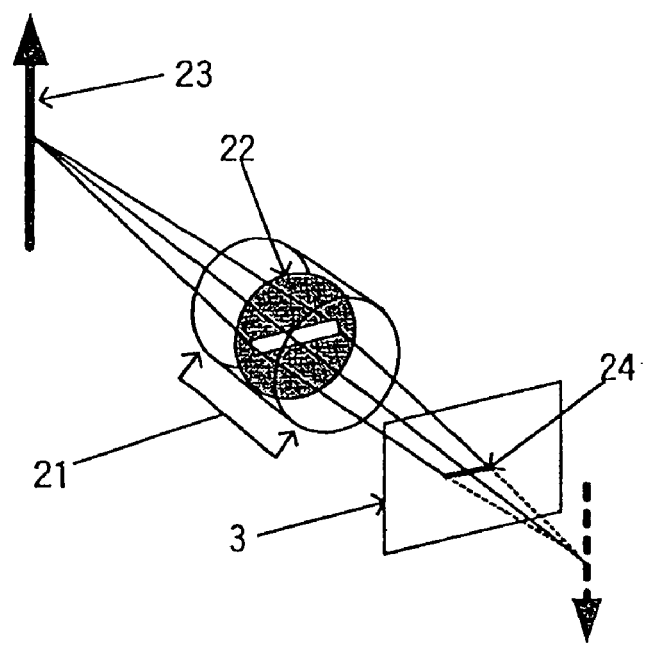
FIG. 4 is an explanatory drawing showing an optical system equipped with a slit-shaped iris diaphragm aperture.

FIG. 4 shows the relation between the configuration of the iris diaphragm aperture and the blur characteristic. For example, in the focusing optical system 21 including one or more lenses, when the iris diaphragm aperture 22 of a horizontally elongated slit shape is used, the light from one point on the photographic object 23 which is out of focus has a spread as shown in the reference numeral 24 on the focusing surface of the CCD 3. Therefore, a blur does not cause in the vertical direction but in the horizontal direction. It is preferable that the aperture of the iris diaphragm exclusively used for a blur control mode has a shape which is not a symmetry of revolution configuration to an optical axis. Concretely, in order to generate a blur only in the horizontal direction, it is preferable to employ a horizontally elongated slit-shaped iris diaphragm as the opening 22. However, in place of this iris diaphragm, another diaphragm having an ellipse-shaped, a half-ellipse-shaped, a wedge-shaped or a rectangle-shaped iris diaphragm may be employed to change the blur. Furthermore, a plurality of openings may be provided in the iris diaphragm.

By the way, a blur that a distribution of light intensity is expressed by a gauss function can be easily calculated with a 2-dimensional blur generating filter. Therefore, the blur is used in the blur control processing disclosed in the "Registration of multi-focus images covering rotation and first reconstruction of arbitrarily focused images by using filters" written by Kubota and Aizawa, "SHINGAKU GIHOU IE 99-25 (1999-07)" supposing that the blur characteristic is known. The blur is also welcomed since a blur appeared in an image becomes soft and looks good.

FIGS. 5 to 8 are explanatory drawings of a blur realization method expressed by a gauss function.

Figure 5:
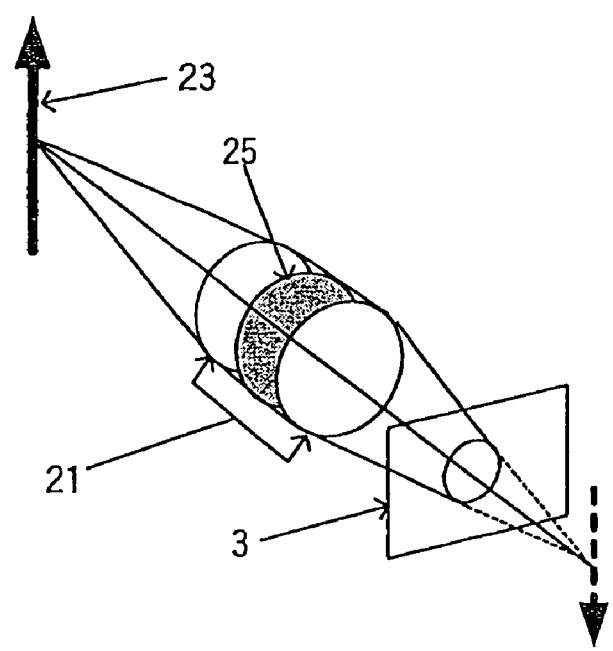
FIG. 5 is an explanatory drawing showing an optical system in which a translucent filter is inserted in an iris diaphragm position.
Figure 6:
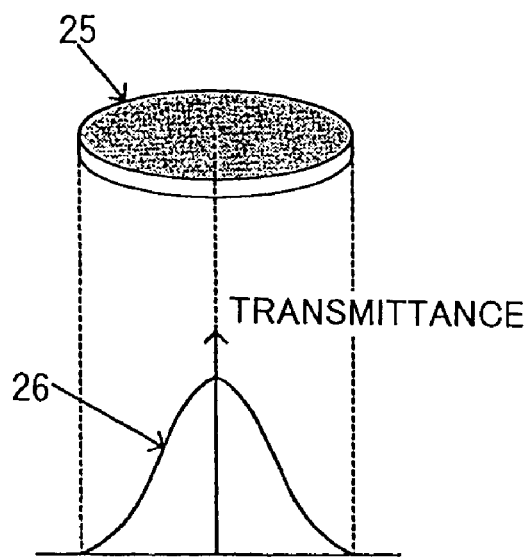
FIG. 6 is an explanatory drawing showing the relation between a filter and the transmittance.

In the method shown in FIG. 5, the filter 25 whose permeability differs by the part, such as a translucent filter 25 whose permeability decreases toward the circumference from the center, is inserted in the iris diaphragm position. In this case, as shown in FIG. 6, the optical intensity distribution of a blur become almost equal to a gauss function by setting the radial light transmittance distribution 26 of the filter 25 almost equally to the gauss function. As mentioned above, when the filter whose transmittance differs by the part is used, an optimum blur control can be attained. Furthermore, in a multiplex image photographing mode, when an exclusive filter for a blur control is used, a blur different from a blur in a normal photographing mode can be obtained.

Figure 7:
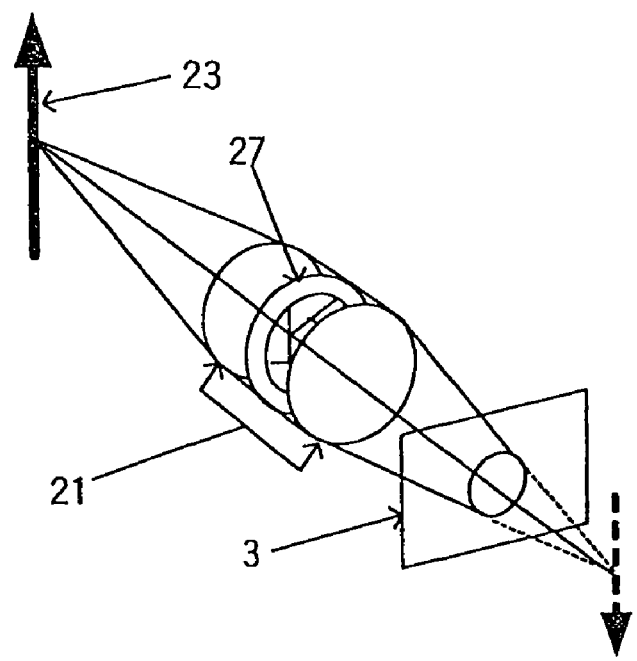
FIG. 7 is an explanatory drawing showing an optical system equipped with an iris diaphragm having a variable aperture.
Figure 8:
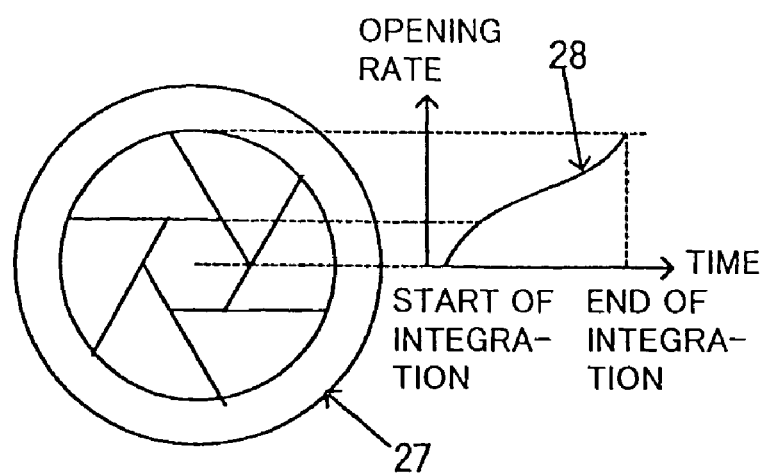
FIG. 8 is an explanatory drawing showing the iris diaphragm, and the relation between the exposure integral time and the opening rate of the iris diaphragm.

Furthermore, in the method shown in FIG. 7, an aperture area adjustable iris diaphragm 27 is used to adjust the aperture area of the iris diaphragm 27 as the time passes during the exposure integration, which enables to obtain a blur characteristic which cannot be realized in a normal iris diaphragm. When the operating-characteristic chart 28 shown in FIG. 8 is set so that aperture time serves as a gauss function of a radial position in any points on an iris diaphragm plane, the blur characteristic approximated with a gauss function can be realized. The same or similar effects can be obtained by controlling not only the iris diaphragm but also the shutter mechanism for controlling the exposure time and/or shutter mechanism which also serves as an iris diaphragm.

In a camera which performs an exposure control by changing both the iris diaphragm and the integral time in a normal photographing, the exposure control will be performed only by integral time when the condition of the iris diaphragm is fixed in a blur control mode. Therefore, the exposure adjustment range will be limited. Accordingly, in a blur control mode, in order to stably obtain an image with proper exposure, it is important to take an image under the exclusive exposure determining condition different from that in a normal photographing mode.

In general, in a solid image pick-up element such as a CCD, the longer the integral time becomes, the larger the noise becomes. Therefore, the maximum integral time is set by considering the amount of noise produced on a screen. In the method for composing a plurality of images, since it is hard to receive the influence of noise, it is possible to lengthen the maximum integral time than the integral time in the normal photographing. Since photographing with an appropriate exposure can be performed even if a light quantity is less than that in a normal photographing, it is effective especially in a case where the iris diaphragm value is set to the maximum value in a blur control mode.

Furthermore, it is possible to expand the exposure adjustment width by selecting one of a plurality of built-in exposure compensation filters such as ND (neutral density) filters or by not using the filter. Since an image can be taken with proper exposure even if there is more light quantity than the case where there is no exposure compensation filter, it is effective when the iris diaphragm is fixed in an opened state especially in a blur control mode.

Figure 9:
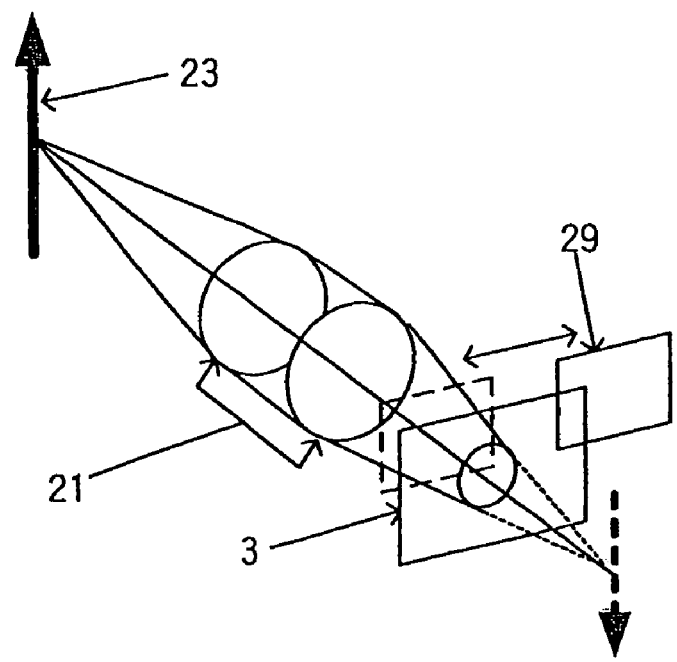
FIG. 9 is an explanatory drawing showing an optical system equipped with an exposure compensation filter insertable into the optical system.

FIG. 9 shows an optical system capable of changing the existence of the exposure compensation filter in the optical path.

In cases where the exposure becomes excessive in the possible shortest integral time or the integral time intentionally set by a photographer, the exposure compensation filter 29 is inserted into the optical path. The insertion position may be in front or behind of the image pick-up lens or in the middle of a plurality of lenses.

Figure 10:
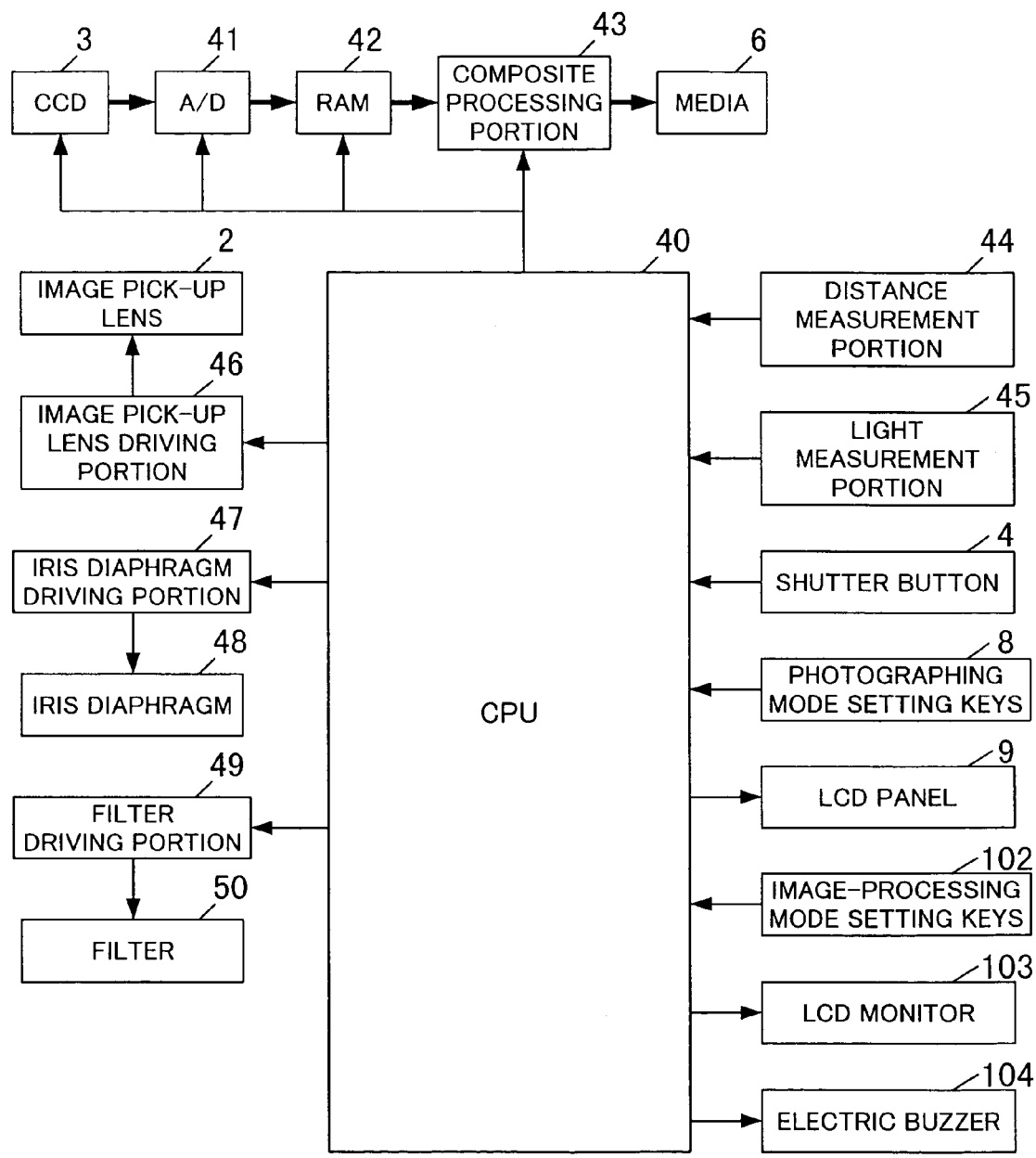
FIG. 10 is a block diagram showing an electric structure of the digital camera.

FIG. 10 is a block diagram showing an electric structure of a digital camera 1. The thin arrow and thick arrow show the flow of control data and the flow of image data, respectively.

The reference numeral 40 denotes a CPU. This CPU stores the photographing conditions and the set status of the photographing mode setting keys 8, etc. at the time of the shutter button 4 being pressed, and displays the exposure conditions, etc. on the liquid crystal display panel 9. Furthermore, the CPU 40 drives the image pick-up lens 2 via the image pick-up lens driving portion 46 so as to focus on a suitable photographic object based on the distance measurement result from the distance measurement portion 44 and also controls the iris diaphragm 48 via the iris diaphragm driving portion 47. Furthermore, when an image composite mode (multiplex image photographing mode) is set, the CPU 40 controls the iris diaphragm 48 and the exposure compensation filter 50 via the iris diaphragm driving portion 47 or the filter driving portion 49, and switches into a photographing condition different from that in a normal photographing mode. In addition, the CPU 40 generally controls the whole digital camera 1.

The analog image signal from the CCD 3 is converted into the digital image data by the A/D converter 41, and is stored temporarily in the image memory (RAM) 42. The CPU 40 makes the recording media 6 store the image data read from the image memory (RAM) 42.

The composite processing portion 43 creates a pan-focus image or a blur controlled image according to the set image-processing mode from a plurality of images different in focal distance. The light measurement portion 45 measures brightness of the photographic object.

Figure 11:
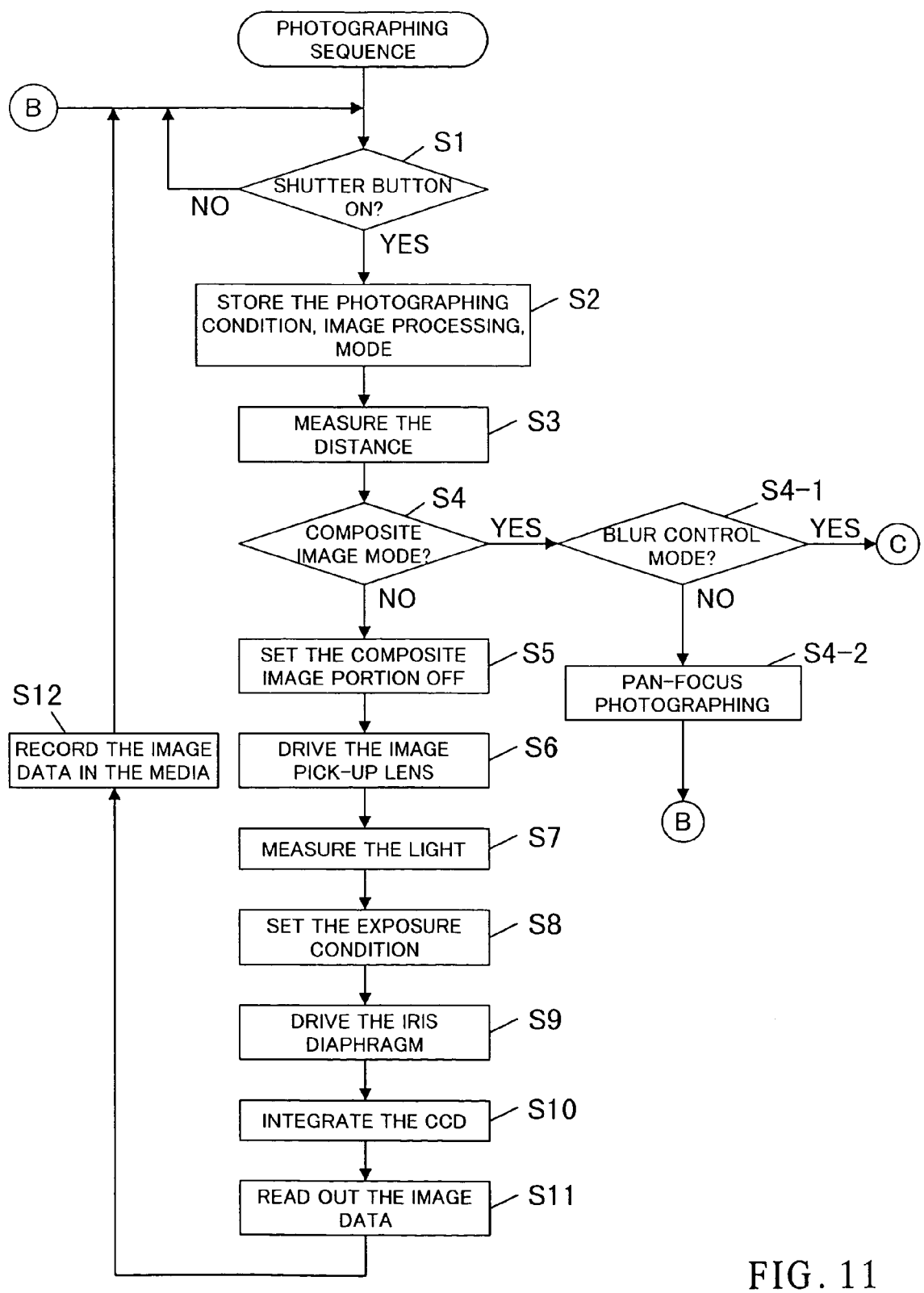
FIG. 11 is a flowchart showing the operation of the digital camera.
Figure 12:
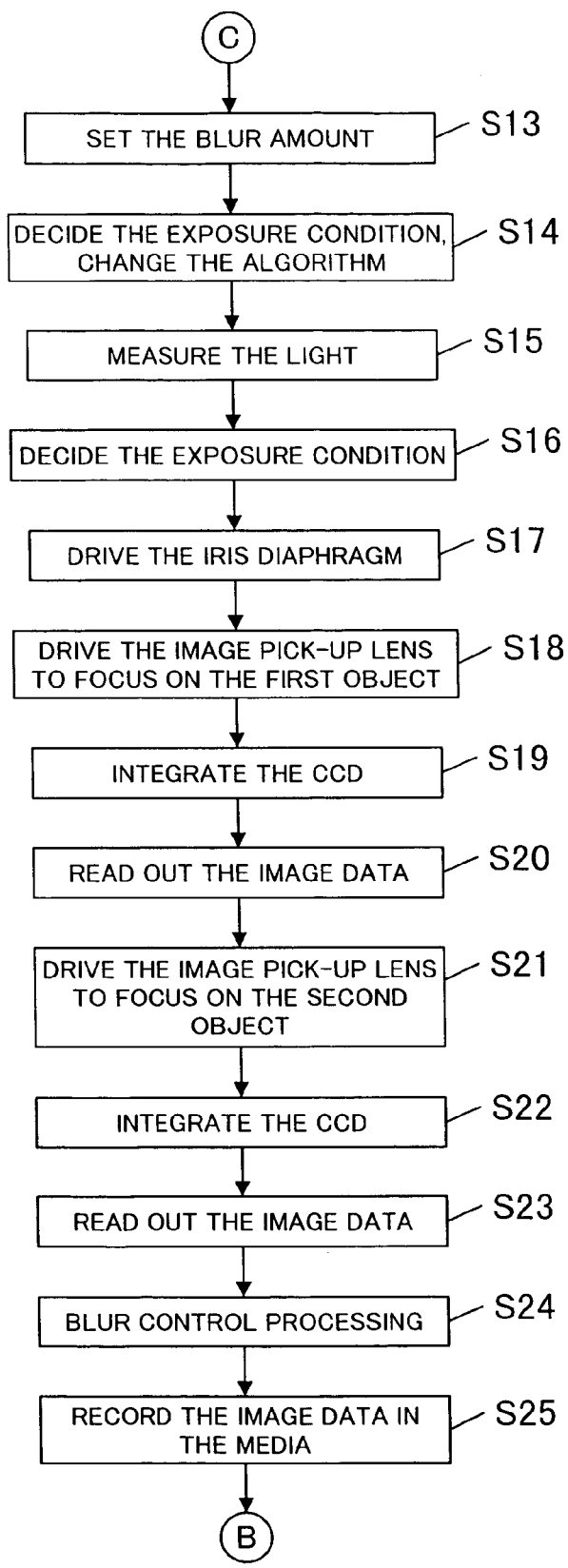
FIG. 12 is a flowchart showing the processing continuing from C in FIG. 11.

FIGS. 11 and 12 show flowcharts of photographing sequence of the first embodiment of the digital camera 1 shown in FIGS. 1, 2 and 10.

The first embodiment will be explained with reference to FIGS. 10 to 12. In following explanation and drawings, a step will be abbreviated as "S."

In S1, when the shutter button 4 is pressed (YES in S1), the CPU 40 reads the photographing conditions and the set image-processing mode and stores them in S2. Then, in S3, the distance to the photographic object is measured by the distance measurement portion 44. The image pick-up element may be used as the distance measurement portion 44 and the light measurement portion 45.

Subsequently, in S4, it is discriminated whether the composite image mode is set as the image-processing mode. When the composite image mode is set (YES in S4), in S4-1, it is discriminated whether the blur control mode is set. When the blur control mode is set (YES in S4-1), the routine proceeds to S13 in FIG. 12. When the blur control mode is not set (NO in S4-1), in S4-2, a pan-focus photographing and a pan-focus image creation processing are performed, and then the routine returns to S1. In S4, when the composite image mode is not set (NO in S4), since it means that a normal photographing mode is set, in S5, the function of the composite processing portion 43 is set to OFF (image data passes without being subjected to composite processing).

Subsequently, in S6, the image pick-up lens 2 is driven via the image pick-up lens driving portion 46 so as to focus on an appropriate photographic object based on the distance measurement result. Subsequently, in S7, a photographic object's brightness is measured by the light measurement portion 45, and then the iris diaphragm value and the exposure time is set in S8. Thereafter, in S9, the iris diaphragm is driven by the diaphragm driving portion 47 to have a predetermined opening diameter.

Then, in S10, the exposure integration is performed for a predetermined time in the CCD 3, and the image data is read out in S11. The read-out image data is converted into digital data by the A/D converter 41 by a pipeline architecture, and is stored temporarily in the RAM 42. In S12, the CPU 40 reads out the image data from the RAM 42 and records the image data into the recording media 6. Then, the routine returns to S1 for the next photographing.

When the blur control mode is set as a result of the judgment in S4-1 (YES in S4-1), in S13 of FIG. 12, the composite processing portion 43 sets the blur amount, and then in S14, the exposure decision algorithm will be changed into an exposure decision algorithm for the aforementioned blur control. In S15, the photographic object's brightness is measured by the light measurement portion 45, and in S16, the combination of the iris diaphragm value and the exposure integral time is determined. In S17, the iris diaphragm is driven by the iris diaphragm driving portion 47 to have a predetermined opening diameter. In S18, the image pick-up lens 2 is driven via the image pick-up lens driving portion 46 to focus on the first photographic object. Then, in S19, exposure integration is performed for the time period decided by the CCD, and the image data is read out in S20. The read-out image data is converted into the digital data by the A/D converter 41 by a pipeline architecture, and is stored temporarily in the RAM 42.

Subsequently, in S21, the image pick-up lens 2 is driven via the image pick-up lens driving portion 46 so that the second photographic object is focused, and exposure integration is performed for a certain time in the CCD 3 in S22, and then the image data is read out in S23. The read-out image data is converted into the digital data by the A/D converter 41 by a pipeline architecture, and is stored temporarily in the RAM 42. Then, in S24, the CPU 40 reads out the image data in the RAM 42 and performs the blur control processing in the composite processing portion 43. Thereafter, the processed image is recorded in the recording media 6 in S25. Then, the routine returns to S1 for the next photographing.

(Second Embodiment)

Figure 13:
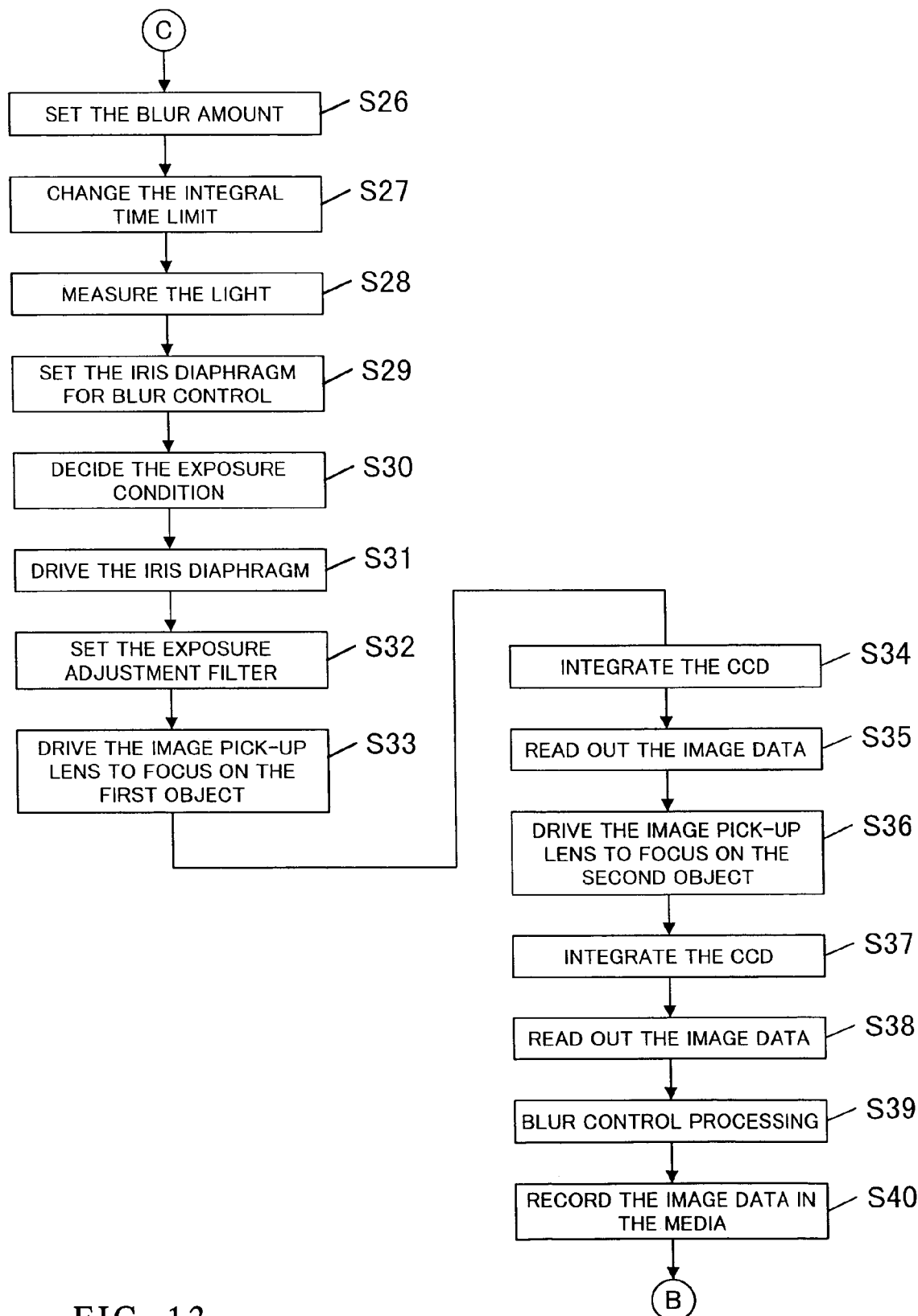
FIG. 13 is a flowchart continuing from C in FIG. 11, which shows the processing of the second embodiment.

FIG. 13 is a part of the flowchart of the photographing sequence of the second embodiment of the digital camera 1. This embodiment will be explained with reference to FIGS. 10 and 13.

When the blur control mode is not set, the same operation as in the first embodiment will be performed.

When the blur control mode is set in S4-1, a blur amount is set in the composite processing portion 43 in S26, and then in S27, the limitation of the exposure integral time is changed into that for the blur control mode. In S28, the photographic object's brightness is measured by the light measurement portion 45, and in S29, the iris diaphragm value is set to the predetermined iris diaphragm value exclusively used for the blur control (e.g. the minimum iris diaphragm value). Thereafter, in S30, the integral time in case of using the exposure compensation filter is determined.

Subsequently, in S31, the iris diaphragm is driven by the iris diaphragm driving portion 47 to have a predetermined opening diameter. Then, in S32, the exposure compensation filter 50 is set by the filter driving portion 49. Then, in S33, the image pick-up lens 2 is driven via the image pick-up lens driving portion 46 so that the first photographic object is focused, and exposure integration is performed for a certain time in the CCD 3 in S34. In S35, the image data is read out. The read-out image data is converted into the digital data by the A/D converter 41 by a pipeline architecture, and is stored temporarily in the RAM 42. Subsequently, the image pick-up lens 2 is driven via the image pick-up lens driving portion 46 in S36 so that the second photographic object is focused.

In S37, exposure integration is performed for a certain time in the CCD 3, and the image data is read out in S38. The read-out image data is converted into the digital data by the A/D converter 41 by a pipeline architecture, and is stored temporarily in the RAM 42. Then, In S39, the CPU 40 reads out the image data in the RAM 42, and then the blur-control processing is performed in the composite processing portion 43. Thereafter, the image data is recorded in the recording media 6 in S40. Then, the routine returns to S1 for the next photographing.

(Third Embodiment)

Figure 14:
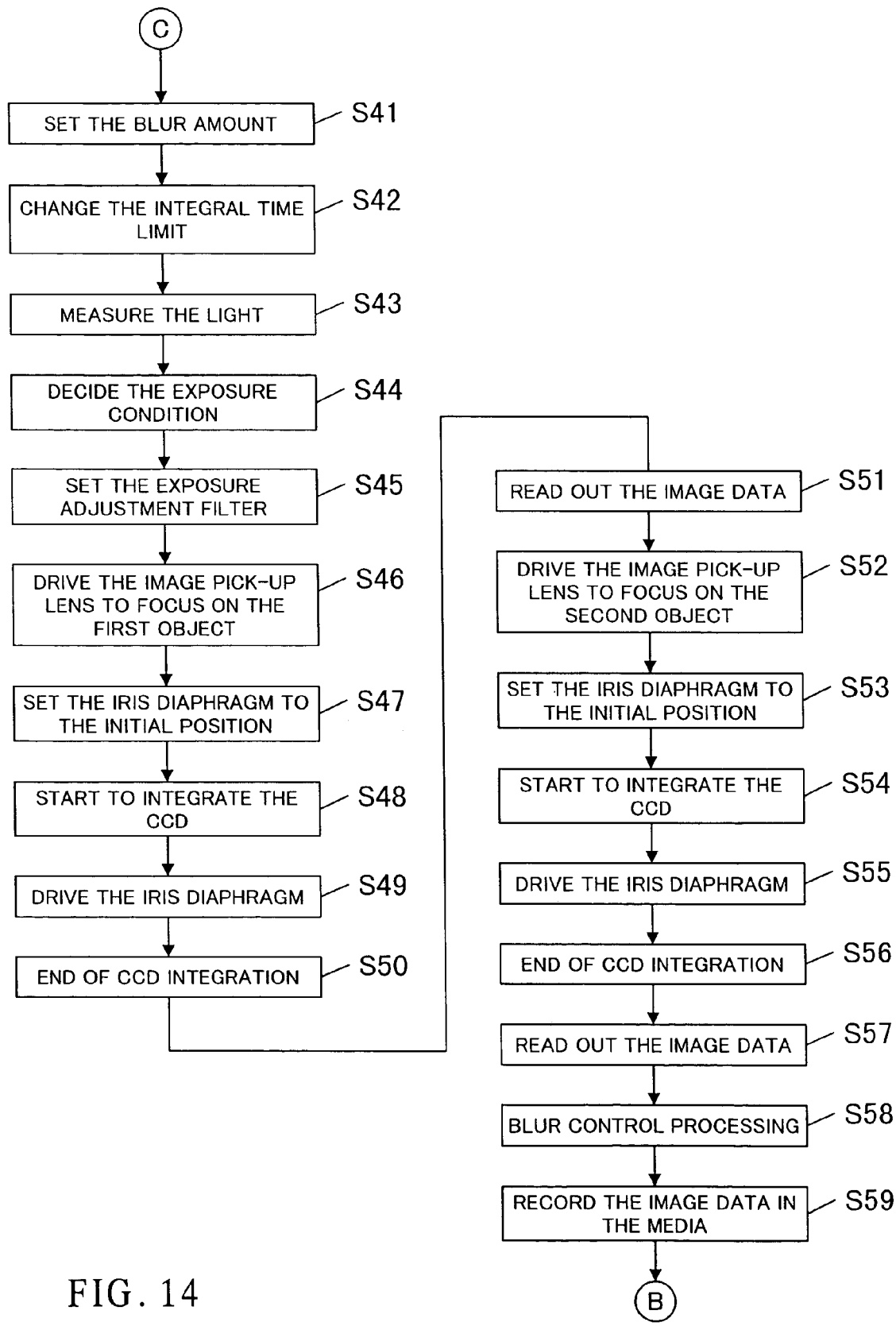
FIG. 14 is a flowchart continuing from C in FIG. 11, which shows the processing of the third embodiment.

FIG. 14 is a part of the flowchart of the image pick-up sequence according to a third embodiment of the digital camera 1. This embodiment will be explained with reference to FIGS. 10 and 14. In this embodiment, the iris diaphragm shown in FIGS. 7 and 8 is employed.

When the blur control mode is not set, the same processing as in the first embodiment will be performed.

When the blur control mode is set in S4-1 (YES in S4-1), the blur amount is set in the composite processing portion 43 in S41, and then a limitation of integral time is changed into the limitation for the variable iris diaphragm in S42.

In S43, the light measurement portion 45 measures the brightness of the photographic object. In S44, the integral time in case of using the exposure compensation filter is determined based on the average iris diaphragm value deduced from the iris diaphragm performance chart shown in FIG. 8 or the like. In S45, the exposure compensation filter 50 is set. Then, in S46, the image pick-up lens 2 is driven via the image pick-up lens driving portion 46 so as to focus on the first photographic object. In S47, the iris diaphragm is set for the initial value position, and thereafter, in S48, the exposure integration in the CCD 3 is started.

In S49, the iris diaphragm is driven according to the predetermined performance chart during the exposure integration in the CCD 3. Thereafter, in S50, the exposure integration in the CCD 3 is terminated. Then, in S51, the image data is read out. The read-out image data is converted into the digital data by the A/D converter 41 by a pipeline architecture, and is stored temporarily in the RAM 42. Subsequently, in S52, the image pick-up lens 2 is driven via the image pick-up lens driving portion 46 so as to focus on the second photographic object. Then, after setting the iris diaphragm for the initial value position in S53, the exposure integration of the CCD 3 is started in S54.

In S55, the iris diaphragm is driven according to the predetermined performance chart during the exposure integration in the CCD 3. Thereafter, in S56, the exposure integration in the CCD 3 is terminated. Then, in S57, the image data is read out. The read-out image data is converted into the digital data by the A/D converter 41 by a pipeline architecture, and is stored temporarily in the RAM 42. Then, in S58, the CPU 40 reads out the image data in the RAM 42, and the read-out image data is subjected to the blur-control processing in the composite processing portion 43. Thereafter, in S59, the image data is recorded in the recording media 6, and then the routine returns to S1 for the next photographing.

(Fourth Embodiment)

The external structure of this digital camera as an image taking apparatus according to this embodiment is the same as that of the digital camera according to the first embodiment shown in FIGS. 1 and 2 except that this digital camera does not have the electronic buzzer 104. Therefore, the explanation thereof will be omitted here.

As mentioned above, a multiplex image photographing is a function which consecutively takes a plurality of images of the same photographic object and subjecting these images to a prescribed composite processing to obtain a single image. Concretely, the multiplex image photographing includes the following photographing besides the photographing for obtaining a pan-focus image or a blur-controlled image as explained in the first to third embodiments.

*High-resolution Photographing

This is the so-called image shifting method disclosed in U.S. Pat. No. 5,402,171. According to this photographing, photographing of a photographic object is performed every time the position of the image pick-up element is minutely displaced to obtain a plurality of image data, and then an image with higher high resolution is created by using a plurality of photographed image data.

* Non-blur Photographing

According to this photographing, when photographing is performed at the shutter speed Ts which may cause hand blurring, a photographic object is photographed n times at the shutter speed Ts/n (the number n should be chosen so as not to occur hand blurring), and then, these images are added to obtain an image with no hand blurring.

* Noise-reduced Photographing

According to this photographing, photographing is performed a plurality of times under the same exposure condition, and then, the obtained plurality of images are added and averaged to reduce noise.

In this fourth embodiment, as the multiplex image photographing, a high-resolution photographing according to the aforementioned image shifting method is employed. However, in the present invention, another multiplex image photographing method can be employed.

Figure 15:
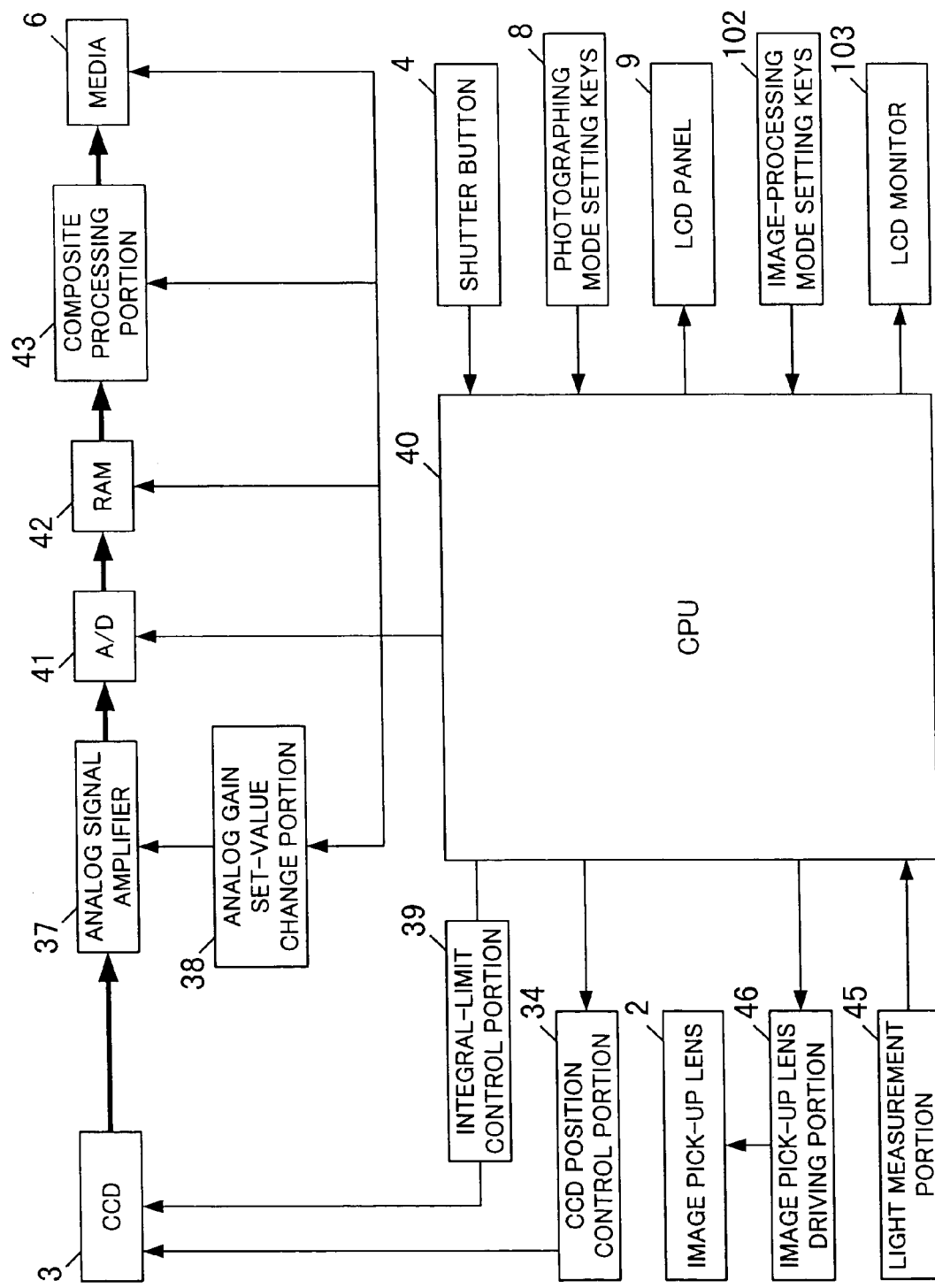
FIG. 15 is a block diagram showing an electric structure of a digital camera to which an image taking apparatus according to the fourth embodiment of the present invention is applied.

FIG. 15 is a block diagram showing the electric structure of the aforementioned digital camera 1. The thin arrow and thick allow show the flow of control data and that of image data, respectively.

In FIG. 15, the CCD 3 is disposed such that the CCD can be minutely displaced in the direction of the optical axis or in the direction perpendicular to the optical axis, and is shifted by the CCD position control portion 34 at the second photographing in the shift photographing mode. The CCD position control portion 34 consists of, for example, piezo electric elements.

The analog signal amplifier 37 amplifies the analog image signal from the CCD 3. The analog gain set-value change portion 38 sets the set-value of sensibility equivalent to ISO sensibility (it is also called a gain value) to the analog signal amplifier 37 depending on the status of the shift photographing mode, i.e., the ON status (multiplex photographing mode) or the OFF status (normal photographing mode).

The A/D converter 41 converts the analog image signal from the CCD 3 into the digital image data, and the image data is temporarily stored in the RAM 42. The composite processing portion 43 is turned OFF (no processing) in the normal photographing mode, and composes a plurality of images to create an image in the shift photographing mode. The recording media 6 stores the image data read out from the RAM 42 in the normal photographing mode, and stores the image data composed by the composite processing portion 43 in the shift photographing mode.

The CPU 40 controls each part, and generally controls the whole digital camera 1. For example, the CPU 40 stores the photographing conditions at the time of the shutter button 4 being pressed, the set-status of the image-processing mode setting keys 102, etc., and also drives the image pick-up lens 2 by controlling the image pick-up lens driving portion 46 based on the measured distance result by the distance measurement window 101.

The reference numeral 45 denotes a light measurement portion. The CPU 40 calculates the integral time of the CCD 3 based on the data from the light measurement portion 45 and integrates (exposes) the CCD 3 via the integral-time control portion 39.

In addition, in this embodiment, as shown in FIG. 16, in the image-processing mode, the gain value (sensibility set-value) equivalent to the ISO sensibility 200 is set at the time of the photographing mode being OFF. The gain value (sensibility set-value) equivalent to the ISO sensibility 800 is set at the time of the shift photographing mode being ON.

Furthermore, the CPU 40 calculates the integral time according to the set gain value, and integrates the CCD 3 via the integral-time control portion 39.

Figure 17:
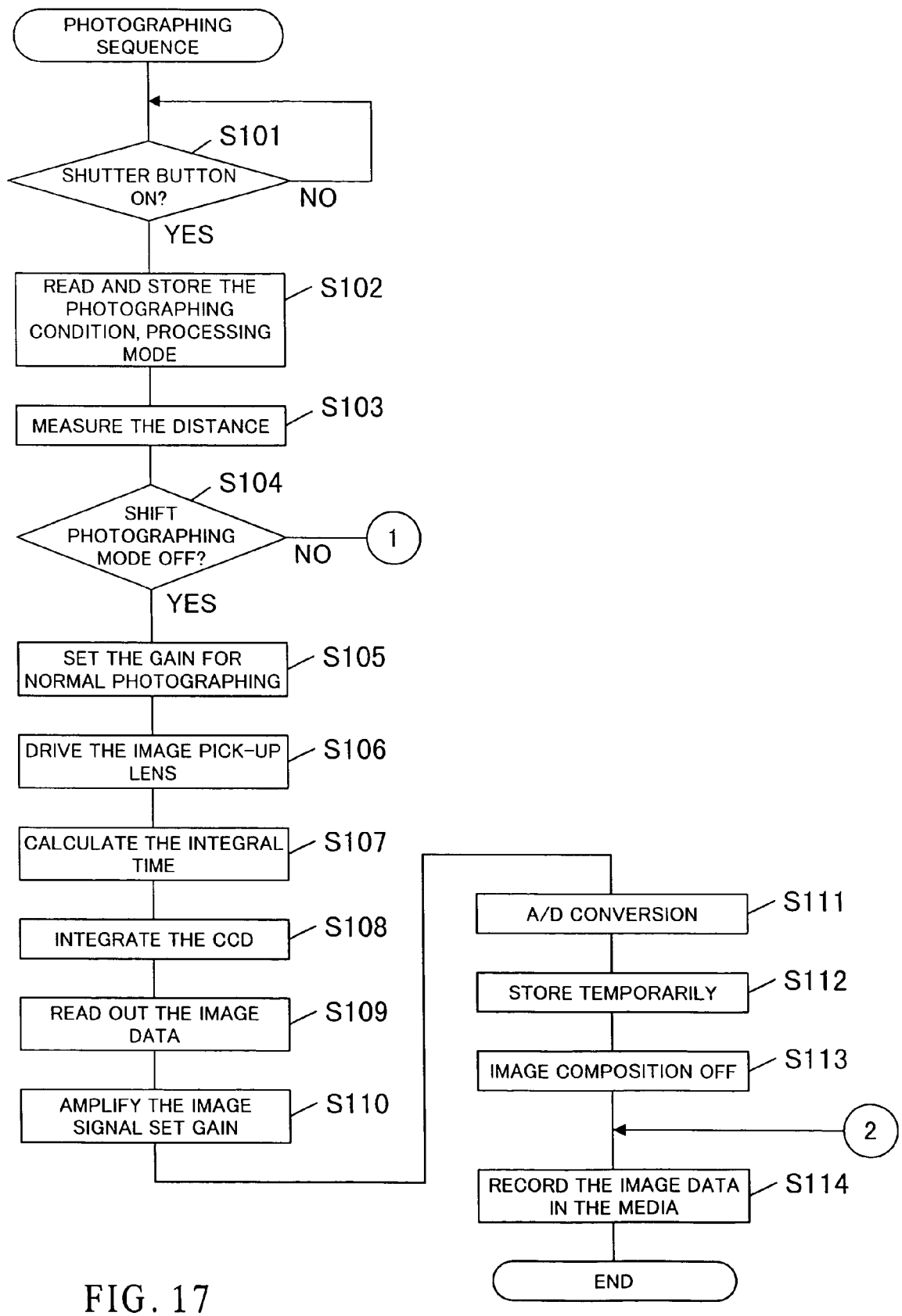
FIG. 17 is a flowchart showing the photographing sequence of the digital camera.

Next, the photographing sequence by the digital camera 1 of the aforementioned structure will be explained with reference to the flowcharts of FIGS. 17 and 18. In the following explanation and drawings, a step is abbreviated as "S."

Before photographing, a user sets an exposure condition such as an iris diaphragm priority, a shutter speed priority, changes a white balance mode, etc., with the photographing mode setting keys 8 and the crystal liquid panel 9.

In S101, it is discriminated whether the shutter button 4 is pressed. When it is discriminated that the shutter button 4 is pressed (YES in S101), in S102, the CPU 40 reads out the photographing condition and the image-processing mode at that time. On the other hand, when it is discriminated that the shutter button 4 is not pressed (NO in S101), the routine waits until the shutter button is pressed. Thereafter, in S103, the distance measurement is performed.

In S104, it is discriminated whether the image-processing mode is the shift photographing mode OFF. When it is discriminated that the shift photographing mode OFF is set (YES in S104), which means the current mode is the normal photographing mode. Accordingly, in S105, the CPU 40 makes the aforementioned analog gain setting change portion 38 adapt the set-value for a normal photographing to perform a normal photographing.

That is, in S106, the image pick-up lens 2 is driven via the image pick-up lens driving portion 46 so as to focus on a photographic object. Thereafter, in S107, the CPU 40 calculates the integral time from the data obtained by the light measurement portion 45 based on the set-gain value (sensibility set-value). Then, in S108, the CCD 3 integrates (exposes) by the calculated integral time via the integral-time control portion 39, and the image signal is read out as data in S109.

In S110, the read-out image signal is amplified by the analog signal amplifier 37 with the set-gain value, or the sensibility set-value equivalent to the ISO sensibility 200. In S111, the amplified image signal is converted into the digital image data by the A/D converter 41, and the digitalized image data are stored temporarily in the RAM 42 in S112. Then, in S113, the CPU 40 makes the composite processing portion 43 turn OFF (no processing), and in S114, the CPU 40 reads out the image data from the RAM 42, and records the image data in the media 6 in S114. On the other hand, in S104, when the shift photographing mode is set (No in S104), the routine proceeds to S201 in FIG. 18 to perform the shift photographing.

Figure 18:
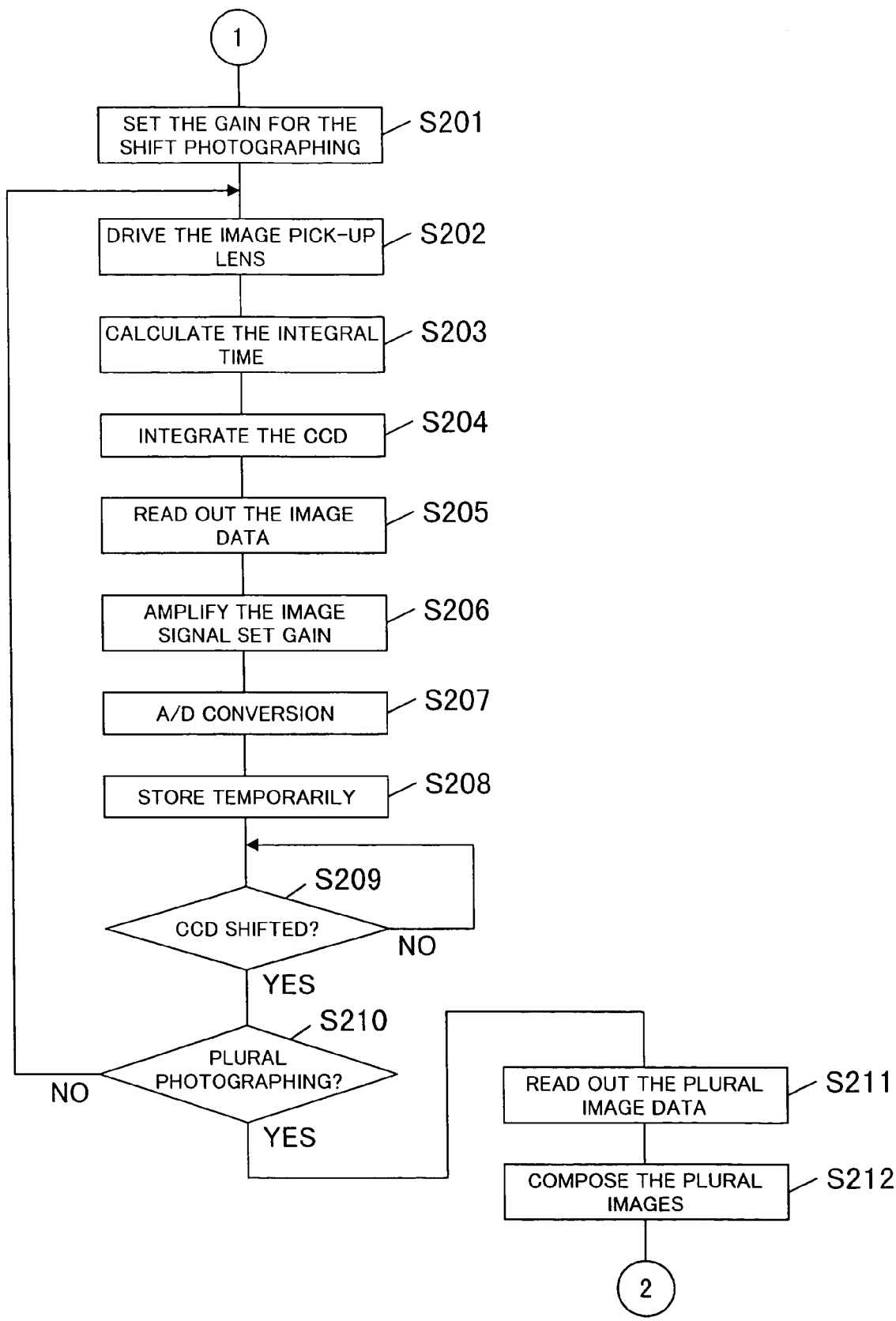
FIG. 18 is a flowchart showing the processing in the shift photographing mode.

In FIG. 18, in S201, the CPU 40 makes the analog gain setting change portion 38 adopt the gain value for the shift photographing, and then photographing is performed. That is, in S202, the image pick-up lens 2 is driven via the image pick-up lens driving portion 46 so as to focus on a photographic object. Thereafter in S203, the CPU 40 calculates the integral time from the data obtained in the light measurement portion 45 based on the set-gain value. In S204, the CPU makes the CCD 3 integrate by the integral time via the integral time control portion 39, and reads out an image signal as a first image data in S205.

In S206, the read-out image signal is amplified by the analog signal amplifier 37 with the gain value equivalent to the ISO sensibility 800, i.e., a larger gain value than that in the normal photographing mode. In S207, the amplified image signal is converted into the digital image data by the A/D converter 41, and the digitalized image data is stored temporarily in the RAM 42 in S208.

Subsequently, in S209, the CPU 40 shifts the position of the CCD 3 via the CCD position control portion 34 and discriminates whether the CCD 3 is displaced by the predetermined amount. When it is discriminated that the position of the CCD 3 is displaced by the predetermined amount (YES in S209), the routine returns to S210 to perform the second photographing. On the other hand, when it is discriminated that the position of the CCD 3 is not displaced by the predetermined amount (NO in S209), the routine stays in S209.

Then, in S210, the CPU 40 discriminates whether a plurality of images are taken. When a plurality of images (two images) are taken (YES in S210), in S211, these two image data is read out from the RAM 42. Thereafter, in S212, the composite processing portion 43 performs the predetermined image-composing processing of the two image data to create one image, and then the image is recorded in the media 6 in S114.

Subsequently, the photographing time for each photographing mode will be explained with reference to FIG. 19.

FIG. 19A shows the time required for photographing at the time of the normal photographing at the gain value equivalent to the ISO sensibility 200. FIG. 19B shows the time required for photographing at the time of performing a multiplex image photographing (a shift photographing) at the gain value equivalent to the ISO sensibility 200. FIG. 19C shows the time required for photographing at the time of performing a multiplex image photographing at the gain value equivalent to the ISO sensibility 800.

In the following explanation, it is assumed that the digital camera 1 is equipped with a CCD 3 having 3 million-pixels and a system clock driven at 60 MHz. Therefore, the time of 0.05 sec is needed for reading out one screen. Furthermore, in the normal photographing mode, photographing is performed at the gain value equivalent to the ISO sensibility 200. In the multiplex image photographing, photographing is performed twice. In this digital camera, it is assumed that the iris diaphragm is fixed and the proper shutter speed at the time of taking an image of a photographic object in a normal photographing mode is 0.1 second as shown in FIG. 19A.

When the multiplex image photographing is performed without changing the gain value equivalent to the ISO sensibility 200, it takes 0.25 second until the multiplex image photographing is terminated as shown in FIG. 19B. In this case, it is hard to cope with a moving photographic object, and the influence of hand blurring, etc. becomes large. Accordingly, a proper image for composite processing is hard to obtain.

On the other hand, as shown in FIG. 19C, when the gain value is changed to the gain value equivalent to the ISO sensibility 800 at the time of the multiplex image photographing, the proper shutter speed will be one fourth of the shutter speed of a normal photographing. In other words, the exposure period per photographing is 0.025 second. As a result, the time required for the multiplex photographing becomes the same time (0.1 second) as required for the normal photographing.

As mentioned above, when the gain value equivalent to ISO sensibility is set higher than the gain value for the normal photographing, a higher shutter speed can be used for a certain integral value, resulting in a shortened photographing time and photographing intervals. Accordingly, even in cases where a photographic object moves and/or hand blurring occurs, a plurality of image data with no problem can be obtained, which enables to subject these image data to composite processing to create a desired image.

Furthermore, it becomes easy to miniaturize the digital camera as compared with the digital camera using many image pick-up elements. Furthermore, it becomes possible to manufacture the digital camera at lower cost as compared with the digital camera employing a high-speed system clock.

In the aforementioned fourth embodiment, as the multiplex image photographing method, the shift photographing method is employed. However, in the present invention, another method may be employed.

Furthermore, in the aforementioned fourth embodiment, the signal magnification processing equivalent to the ISO sensibility is performed by the analog signal amplifier 37. However, in the present invention, a signal processing equivalent to the ISO sensibility may be performed by providing a digital signal amplifier to the image data converted by the A/D converter 41. Furthermore, a gamma compensation portion may be equipped.

Furthermore, in the aforementioned first to fourth embodiments, the composite processing portion 43 which composes a plurality of images taken in the multiplex image photographing mode to create one image is provided in the digital camera 1 so that a single photographing apparatus can be performed from the acquisition of a plurality of images to the generation of an image. However, the digital camera may perform only the photographing without providing an image composition portion, and the image composition may be performed by an image processing apparatuses such as a personal computer.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. A present invention permits any design-change, unless it deviates from the soul, if it is within the limits by which the claim was performed.

What is claimed is:

1. An image taking apparatus, comprising:
   an image sensor which picks up an image of a photographic object;
   a selector which selects a first photographing mode or a second photographing mode, said second photographing mode being a mode for composing a plurality of picked-up images to create a composite image;
   an amplifier for amplifying an output of the image sensor responsive to a gain value; and
   a controller which makes said image sensor pick up an image of said photographic object using a first exposure program and a first gain value when said first photographing mode is selected by said selector, and makes said image sensor pick up a plurality of images of said photographic object using a second exposure program and a second gain value when said second photographing mode is selected by said selector, wherein said second exposure program is different from said first exposure program and said second gain value is larger than said first gain value.

2. The image taking apparatus as recited in claim 1, wherein said second photographing mode is a mode for controlling blur degree of said plurality of picked-up images.

3. The image taking apparatus as recited in claim 1, further comprising an iris diaphragm which regulates quantity of light incident on said image sensor.

4. The image taking apparatus as recited in claim 3, further comprising a detector which detects brightness of said photographic object, wherein said controller determines an iris diaphragm value and an exposure time of said image sensor based on detected brightness of said photographic object.

5. The image taking apparatus as recited in claim 4, wherein said controller sets said exposure time of said image sensor to the shortest time and makes said image sensor pick up a plurality of images of said photographic object when said second photographing mode is selected.

6. The image taking apparatus as recited in claim 4, wherein said controller fixes said iris diaphragm value and makes said image sensor pick up a plurality of images of said photographic object when said second photographing mode is selected.

7. The image taking apparatus as recited in claim 6, wherein said controller fixes said iris diaphragm value to the maximum value or the minimum value.

8. The image taking apparatus as recited in claim 3, wherein said controller adjusts said iris diaphragm during an exposure period by said image sensor.

9. The image taking apparatus as recited in claim 3, wherein said iris diaphragm has an asymmetrical aperture.

10. The image taking apparatus as recited in claim 1, wherein said controller sets an exposure time of said image sensor to be longer than that in said first photographing mode when said second photographing mode is selected.

11. The image taking apparatus as recited in claim 1, wherein said controller inserts a filter for exposure adjustment into an optical path of a photographing optical system when said second photographing mode is selected.

12. The image taking apparatus as recited in claim 11, wherein said filter transmittance varies radially.

13. The image taking apparatus as recited in claim 12, wherein the filter transmittance distribution is approximately a Gaussian function.

14. An image taking apparatus, comprising:
   an image sensor which takes an image of a photographic object;
   a selector which selects a first photographing mode or a second photographing mode;
   an amplifier which amplifies an output from said image sensor; and
   a controller which sets a first gain value to said amplifier, and makes said image sensor pick up an image of said photographic object when said first photographing mode is selected, and sets a second gain value higher than said first gain value to said amplifier and makes said image sensor pick up a plurality of images of said photographic object when said second photographing mode is selected by said selector.

15. The image taking apparatus as recited in claim 14, wherein said second photographing mode is a mode in which a plurality of images of said photographic object are picked up while displacing a position of said image sensor and a plurality of picked-up images are composed.

* * * * *